Aug. 5, 1958     L. T. DAIGLE     2,845,701
CONVEYOR CABLE ELEMENTS AND METHOD OF MANUFACTURE
Filed Aug. 6, 1953     2 Sheets-Sheet 1
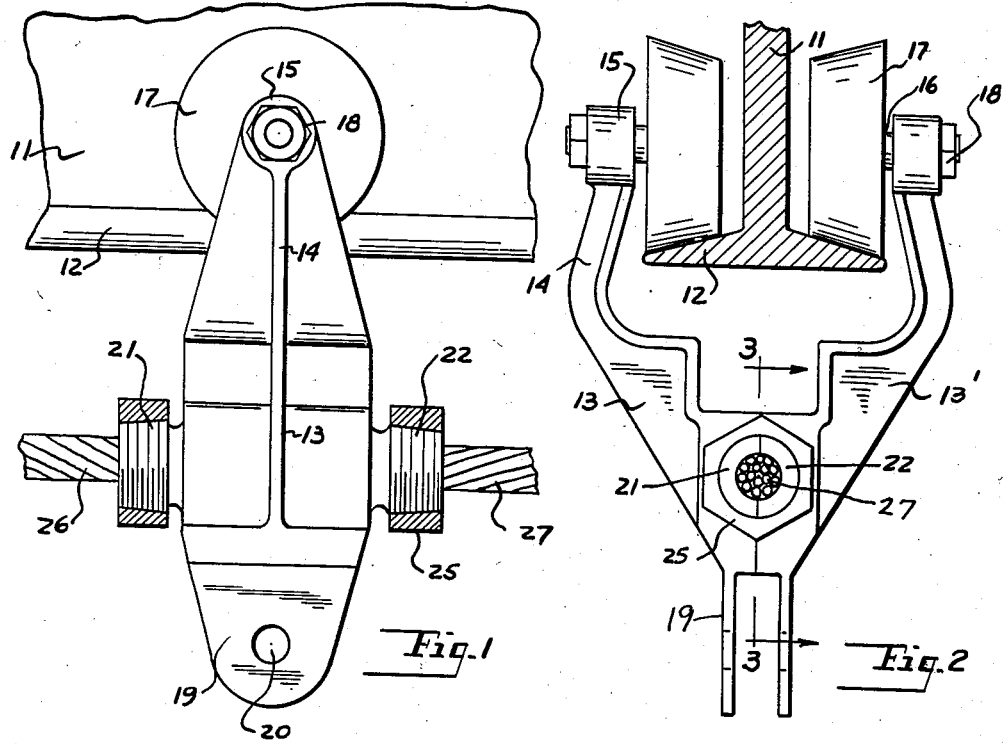
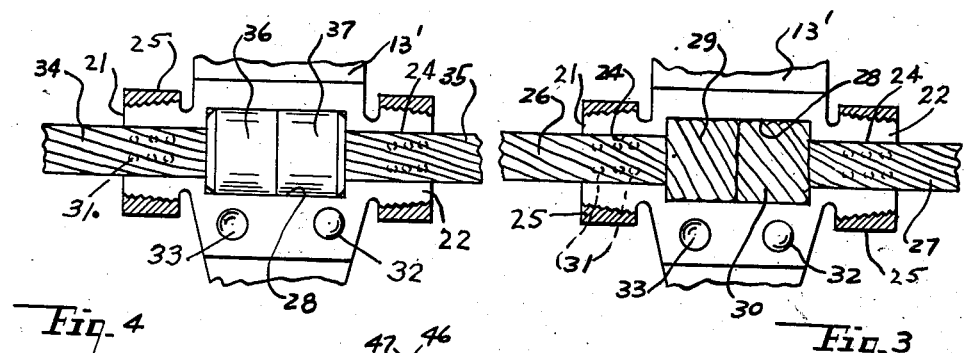
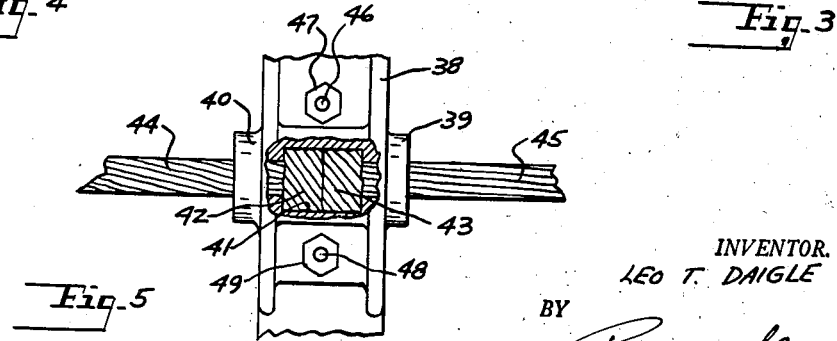
INVENTOR.
LEO T. DAIGLE
BY
Robert A. Sloman
ATTORNEY.

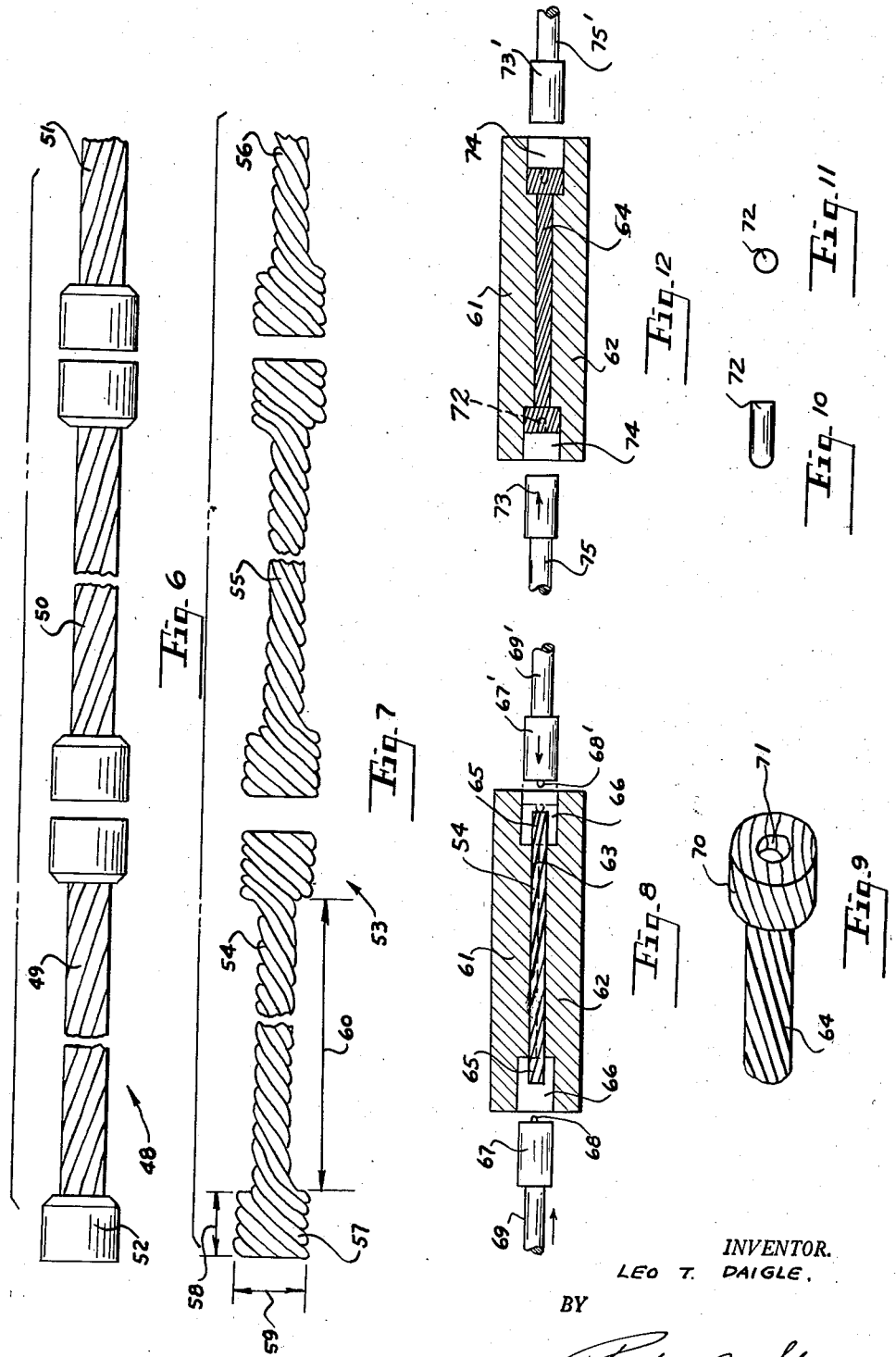

United States Patent Office 2,845,701
Patented Aug. 5, 1958

2,845,701

CONVEYOR CABLE ELEMENTS AND METHOD OF MANUFACTURE

Leo T. Daigle, Detroit, Mich., assignor to Dearborn Fabricating & Engineering Company, Detroit, Mich., a corporation of Michigan Application August 6, 1953, Serial No. 372,671

1 Claim. (Cl. 29—516)

This invention relates to conveyors, and more particularly to trolley conveyors movable along the flange of a beam adapted to be interconnected by a series of longitudinally arranged cable elements to form a continuous cable, which cable effects longitudinal movement of said conveyors.

It is the object of this invention to provide a novel method of forming the elements, of which the cable comprises and so constructing the end portions thereof as to make them readily attachable within a pair of conveyor bracket elements mounted by a suitable trolley upon the flange of a beam.

It is the further object of this invention to provide a novel process for upsetting the opposite ends of the cable elements forming said continuous cable, whereby a uniform dimension may be obtained as to the diameter and length of the upset head, as well as uniform lengths of cable elements.

These and other objects will be seen from the following specification and claim, in conjunction with the appended drawings in which:

Fig. 1 is a side elevational view of the conveyor bracket, partially sectioned, for illustration, and illustrating the splicing of a pair of cable elements.

Fig. 2 is a right end elevational view thereof.

Fig. 3 is a section taken on line 3—3 of Fig. 2.

Fig. 4 is a view similar to Fig. 3, but showing a slight variation in the cable elements spliced.

Fig. 5 is a fragmentary side elevational view similar to Fig. 1 with the trolley wheel mounting omitted and with the load support omitted, illustrating the splicing of a pair of cable elements in a slightly different manner.

Fig. 6 is a fragmentary exploded view of a plurality of cable elements, which when spliced within conveyor brackets will form one form of continuous cable.

Fig. 7 is a side elevational exploded view of a series of slightly differently formed cable elements, which when spliced by a series of conveyor brackets form a slightly different form of continuous cable.

Fig. 8 is a diagrammatic elevational section of the apparatus employed in the method of forming the cable elements.

Fig. 9 is a fragmentary perspective view of one end of a cable element after the initial forming step.

Fig. 10 is a side elevational view of the metallic filler inserted within the central aperture formed within the initially upset head of the cable element.

Fig. 11 is an end view thereof; and

Fig. 12 is a view similar to Fig. 8 illustrating the secondary forming dies for completing the upset ends of the cable elements shown in Fig. 7.

It will be understood that the above drawings illustrate merely a preferred embodiment of the invention, and that other embodiments are contemplated within the scope of the claim hereafter set forth.

Referring to the drawings, Figs. 1, 2 and 3, illustrate one bracket formation by which a pair of adjacent longitudinally aligned cable elements are spliced together, and in which are employed a pair of opposed upright bracket elements 13 and 13'. The upper portions of said brackets include the upwardly extending inwardly directed arms 14 with heads 15 and their upper ends transversely apertured to receive the mounting studs 16 and the wheels 17, which are adapted to ride upon the opposed flanges 12 of I beam 11.

Studs 16 are secured within heads 15 by the nuts 18. Each of the brackets have at their lower ends the parallel spaced depending load supporting elements 19 transversely apertured at 20. Each of the brackets intermediate their ends have the oppositely directed laterally extending semi-circular elements 21 and 22, which are tapered. The opposing semi-circular elements 22 and 21 of the brackets 13' and 13 together form a unitary tapered lug adapted to threadedly receive the interiorly tapered nuts 25, whereby the brackets 13 and 13' are bolted together.

As shown in Fig. 3, each of the bracket elements 13 and 13' have formed therein the central internal recesses 28, which recesses terminate at their outer ends in the cable receiving recesses 24 extending outwardly through the laterally projecting elements 21 and 22.

A pair of cable elements 26 and 27, of which there may be a large number, arranged in longitudinal alignment are adapted to be secured to the conveyor brackets when assembled, said cable elements having upon their registering inner ends the upset formed cylindrical heads 29 and 30 of a diameter greater than the cable diameter. Said upset heads cooperatively nest within the opposed recesses 28 in brackets 13 and 13' when assembled with the outwardly extending portions of said cable elements lying within the opposed recesses 24 in the lateral extensions of said brackets, as shown in Fig. 3.

Throughout the interior surfaces of the elongated recesses 24 are formed projections 31, which cooperatively and grippingly engage the cable elements for further securing the same to the brackets when secured together by the nuts 25. Naturally, it is contemplated that the minimum internal diameter of said nuts is slightly greater than the diameter of the heads 29 and 30, so that said nuts may be positioned thereover.

The brackets 13 and 13' have formed in their inner surfaces the circular projection 32 and an adjacent circular recess 33 adapted to cooperatively register with a corresponding recess and projection within the other bracket element, to further secure the bracket elements to each other.

A slight variation is shown in Fig. 4, wherein the cable elements 34 and 35 to be spliced together have secured upon their ends the cylindrical heads 36 and 37, which are adapted to cooperatively nest within recesses 28 formed within the bracket elements. The only difference between Fig. 4 and Fig. 3 is that instead of upsetting the cable elements, separately formed cylindrical heads of increased diameter are secured to the ends of a pair of cable elements in any suitable fashion as by swaging, welding or brazing, for illustration.

Another variation of conveyor structure is shown in Fig. 5, wherein the bracket elements 38, fragmentarily shown, have opposed laterally extending and registering semi-circular shoulders 39 and 40, which are centrally apertured to receive the cable elements 44 and 45. Each of the bracket elements 38 have formed therein the recesses 41 of greater diameter than said cable elements adapted to receive the upset enlarged cylindrical heads 42 and 43 formed in said cable elements in the manner and by the process hereinafter described in connection with Figs. 8, 9, 10, 11 and 12.

Instead of the tapered nuts 25, the brackets 38 are secured together by the bolts 46 and 48 and their respective nuts 47 and 49, which are arranged above and below the shoulders 39 and 40.

Fig. 6 is an exploded view showing a plurality of cable elements 49, 50, and 51, with cylindrical heads 52 of increased diameter at their opposite ends, which when in registry and when spliced within the conveyor brackets above described are adapted to form a continuous cable 48.

Fig. 7 shows another continuous cable 53, which is formed from a plurality of cable elements 54, 55 and 56, whose opposite ends are upset as at 57, and which when assembled in longitudinal registry and when spliced within the conveyor brackets above described, thereby form a continuous cable.

In the manner and by the method hereafter described, the upset ends 57 of said cable elements are very accurately formed, so that in all cable elements the head will have the same length as indicated at 58, the same diameter 59 and furthermore the heads of a single cable element will all have the same longitudinal spacing between each other as at 60.

The present cable elements, such as element 54, is formed within a pair of mating and engaging dies 61 and 62, each of which has formed in its inner surface an elongated semi-circular recess 63 adapted to cooperatively and retainingly receive the greater portion of the length of the cable element 54. The ends 65 of said cable element extend into the cylindrical recess 66 between the dies 61 and 62, each die having formed therein an opposed semi-circular recess.

As an initial forming step, the cylindrical die elements 67 and 67' in axial registry and having central inwardly projecting formations 68 and 68' are simultaneously moved towards each other into the cavities 66 under the action of the rams 69 and 69', which may form the part of a hydraulic ram or other mechanism for moving the die elements compressively inwardly for forming engagement with the ends 65 of the cable elements 54, to thereby initially upset the same.

As the cable element 54 consists of a series of spirally wrapped strands, the initially formed upset head 70 shown in Fig. 9, will also have said strands spirally formed, so that normally even without the projections 68 and 68' there would be a central cavity or recess 71 formed at the head 70.

To improve the structure the projections 68 and 68' are formed on the die elements 67 and 67' to both define and form this central opening 71. As a second step, a cylindrical filler 72 is inserted within the central openings 71 in each initially formed head, which filler is forced entirely within said central opening.

As a subsequent step in the formation of the heads 70, a second pair of die elements 73 and 73' are compressively moved into the cavities 74 under the action of suitable rams 75 and 75' to effect the final formation of the upset heads 70 upon the opposite ends of the cable element.

As a final step, the end portions of the upset ends 70 are flash welded or brazed to fuse the ends of the cable with the plug 72 to thereby form a unitary upset head 70 to increase the strength thereof.

By this process the opposite upset ends of a particular cable element are formed simultaneously and are of uniform diameter and length and are uniformally spaced in the manner above described.

Having described my invention, reference should now be had to the claim which follows for determining the scope thereof.

I claim:

The method of forming a cable element comprising supportably retaining a length of helically wound cable intermediate its ends and throughout said intermediate portions, longitudinally and compressively upsetting simultaneously the opposite ends of said cable to form cylindrical heads of increased diameter, simultaneously forming central outwardly opening recesses at their outer ends, laterally restraining simultaneously said upset ends to a predetermined diameter, inserting a fusable head reinforcing metallic filler within said recesses, further compressively forming simultaneously said heads with inserted fillers to a predetermined diameter and length, and fusing said heads with said fillers to provide rigid head units.

References Cited in the file of this patent

UNITED STATES PATENTS

| | | |
|---|---|---|
| 984,851 | Reed | Feb. 21, 1911 |
| 1,466,127 | Gottschalt | Aug. 28, 1923 |
| 1,804,923 | Fernekes et al. | May 12, 1931 |
| 2,009,206 | Rosner | July 23, 1935 |
| 2,604,974 | Daigle | July 29, 1952 |
| 2,624,449 | Williams | Jan. 6, 1953 |
| 2,633,226 | Vogt | Mar. 31, 1953 |

FOREIGN PATENTS

| | | |
|---|---|---|
| 277,423 | Switzerland | Nov. 16, 1951 |